United States Patent [19]

Hatanaka et al.

[11] Patent Number: 5,442,271
[45] Date of Patent: Aug. 15, 1995

[54] INDUCTION MOTOR CONTROL APPARATUS PROVIDING HIGH EFFICIENCY WITH RAPID RESPONSE TO CHANGES IN LOAD TORQUE

[75] Inventors: Takefumi Hatanaka; Naruto Kuwahara, both of Tokyo, Japan

[73] Assignee: Arex Electronics Corporation, Tokyo, Japan

[21] Appl. No.: 259,836

[22] Filed: Jun. 15, 1994

[30] Foreign Application Priority Data

Jun. 21, 1993 [JP] Japan .................................. 5-187681

[51] Int. Cl.$^6$ ............................................. H02P 5/40
[52] U.S. Cl. ................................. 318/729; 318/803; 318/811
[58] Field of Search ................ 318/729, 727, 798–821

[56] References Cited

U.S. PATENT DOCUMENTS

| | | | |
|---|---|---|---|
| 4,249,120 | 2/1981 | Earle | 318/729 |
| 4,266,177 | 5/1981 | Nola | 318/810 |
| 4,400,655 | 8/1983 | Curtiss et al. | 318/729 |
| 4,469,997 | 8/1984 | Curtiss et al. | 318/729 |
| 4,482,852 | 11/1984 | Muskovac | 318/729 |
| 4,629,960 | 12/1986 | Welsh et al. | 318/729 |
| 4,636,702 | 1/1987 | Hedges | 318/729 |
| 5,010,287 | 4/1991 | Mukai et al. | 318/729 X |
| 5,204,606 | 4/1993 | Kuwahara et al. | 318/812 X |
| 5,241,256 | 8/1993 | Hatanaka et al. | 318/801 |

*Primary Examiner*—David S. Martin
*Attorney, Agent, or Firm*—Jordan and Hamburg

[57] ABSTRACT

An induction motor control apparatus, for converting an AC power supply voltage to a motor supply voltage for an induction motor, includes a feedback control loop for controlling the level of the motor supply voltage such that the induction motor operates close to a predetermined value of power factor, and also includes circuits for deriving a signal which varies in accordance with the motor admittance (or impedance), and for differentiating that signal to obtain a parameter variation signal which indicates an amount and direction of any sudden change in the motor load torque. The parameter variation signal is applied to the control loop such as to immediately increase or decrease the motor supply voltage, as required, when any sudden change in load occurs, thereby ensuring rapid control response together with stability of control.

7 Claims, 15 Drawing Sheets

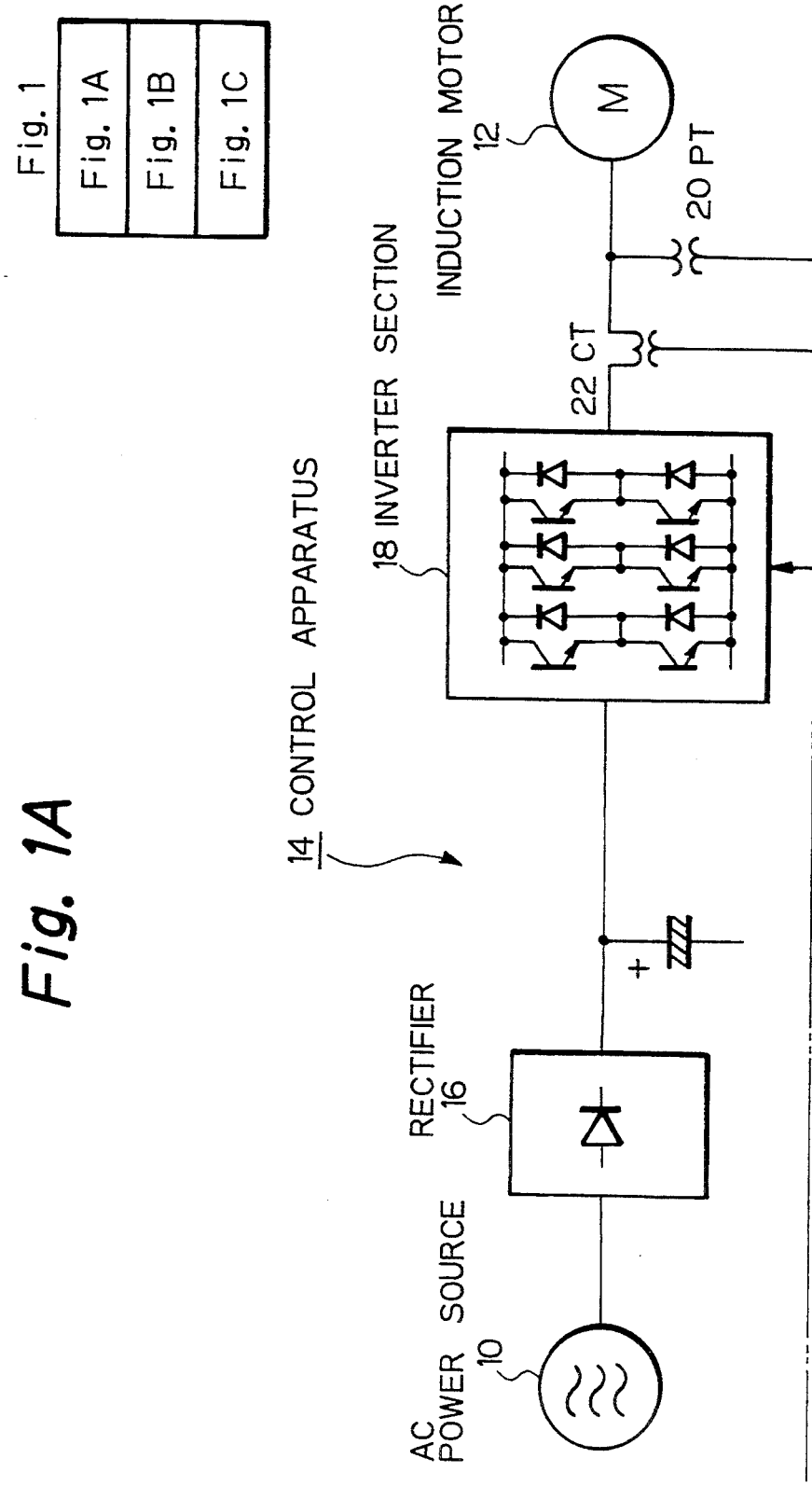

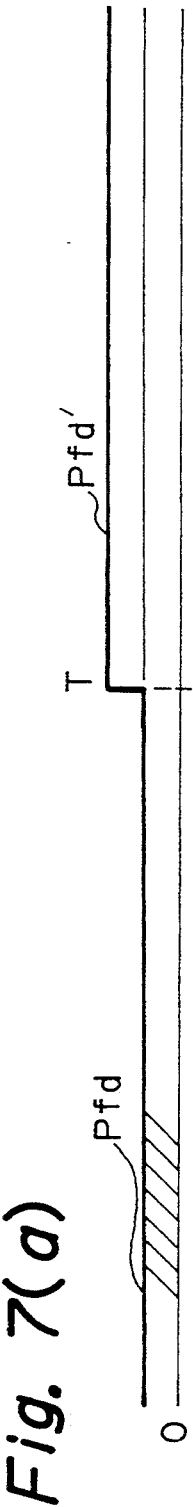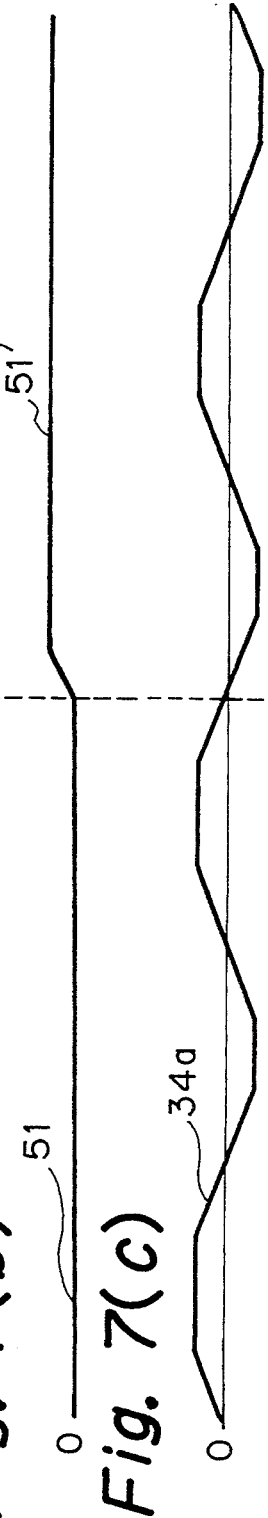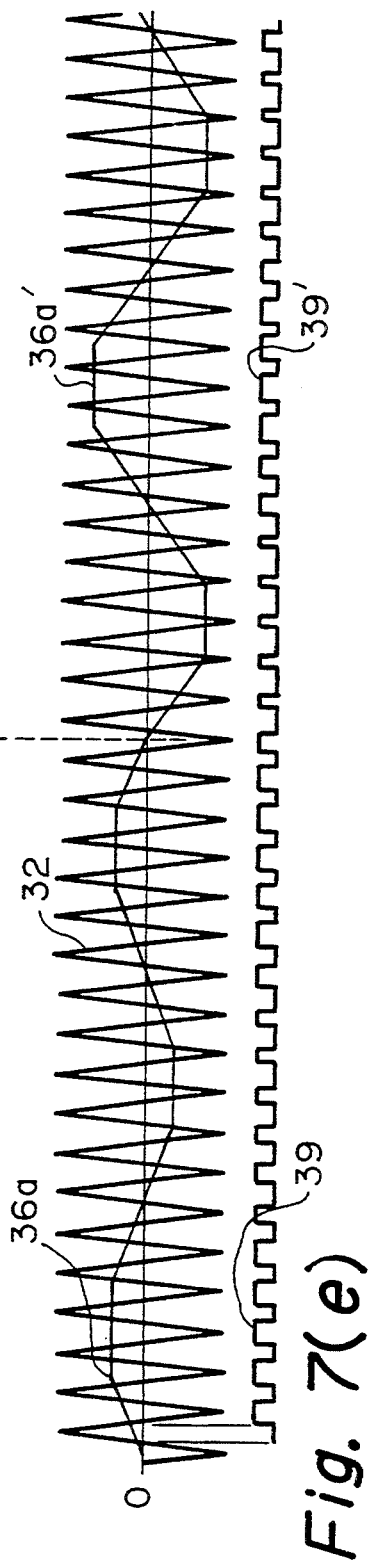

| Fig. 10A | Fig. 10B | Fig. 10C |

INDUCTION MOTOR CONTROL APPARATUS PROVIDING HIGH EFFICIENCY WITH RAPID RESPONSE TO CHANGES IN LOAD TORQUE

BACKGROUND OF THE INVENTION

1. Field of the Invention

The present invention relates to a power supply control apparatus (referred to in the following simply as a control apparatus) for controlling the supply voltage of an induction motor, and in particular to an induction motor control apparatus which provides a high efficiency of operation.

2. Description of the Related Art

In the prior art, there have been proposals for a type of induction motor control apparatus whereby the power factor at which an induction motor operates is detected, and a feedback control loop is utilized to control the level of supply voltage of the induction motor such as to maintain the operating power factor close to a target value, i.e. a value which will ensure a high degree of operating efficiency. Such a type of apparatus can be effective if the variations in load torque applied to the induction motor occur in a relatively gradual manner. However in the case of an induction motor which is subjected to abrupt changes in load torque, and in particular with abrupt changes from a light load to a high load condition occurring, it is found that control by such a prior art type of apparatus is ineffective, so that the induction motor cannot follow the changes in applied load. In some cases, if a sudden increase in load torque occurs, and the control apparatus cannot increase the supply voltage of the motor sufficiently rapidly to counteract the increased load, then the motor may stall.

If it is attempted to modify such a prior art type of induction motor control apparatus such that the motor supply voltage will change more rapidly, i.e. such that the supply voltage can closely follow a sudden increase in motor load, it is found that the control apparatus becomes unstable, and oscillation may occur. Thus, satisfactory control cannot be achieved. It is thus necessary to incorporate an integrator circuit into the aforementioned feedback control loop, to reduce the rate at which the motor supply voltage can change. Hence the above problem cannot be overcome, i.e. the induction motor cannot follow a sudden change in the applied load torque. If there is a sudden increase in the load torque which exceeds the drive capability of the motor (i.e. the drive capability provided by the level of motor supply voltage that is currently being applied) then a rapid increase in the degree of motor slip will occur. As a result, there will be a sudden drop in the value of motor power factor that is detected by the control apparatus. When that occurs, then in spite of the fact there is a need for the motor supply voltage to be increased, the control apparatus will actually function to lower the motor supply voltage, so that the motor may stall.

SUMMARY OF THE INVENTION

It is an objective of the present invention to overcome the problems of the prior art set out above, by providing an induction motor control apparatus which will provide a high degree of efficiency of operation, and which will control the motor supply voltage such as to rapidly respond appropriately to any sudden changes in the load torque applied to the motor, but which provides stability of operation.

To achieve the above objective, an induction motor control apparatus according to the present invention controls the motor supply voltage in accordance with a combination of the value of detected power factor at which the motor is operating and any change in value of a specific operating parameter of the motor, where the operating parameter is a parameter which varies in response to a sudden change in the load torque applied to the motor. The operating parameter is preferably the motor admittance or impedance.

Under operation at a steady load torque, or load torque which varies only slowly, the control apparatus controls the induction motor supply voltage such as to maintain the motor power factor at a desired reference value, by detecting any difference between the actual power factor of the motor and the reference power factor. However when a change in motor load occurs, resulting in a corresponding change in the motor admittance (or impedance) as well as a change in the power factor, then while the load is changing, the motor supply voltage is modified in accordance with the rate of change of the motor admittance (or impedance), as well as being controlled in accordance with the difference between the actual power factor at which the motor is operating and the reference power factor value. As a result, it is found that such a control apparatus enables an induction motor to rapidly respond to sudden changes in applied load, while achieving a high degree of operating efficiency, and complete stability.

More specifically, the present invention provides an induction motor control apparatus for controlling the value of an AC voltage which is derived from an AC power source voltage and is supplied to an induction motor as a motor supply voltage, the apparatus comprising:

conversion means for converting said AC power source voltage to said motor supply voltage;

means for producing a modulation signal varying in accordance with a deviation of an actual value of power factor of said induction motor and a target value of power factor, and for supplying said modulation signal to said conversion means to control said motor supply voltage such as to bring said actual value of power factor close to said target value;

means for monitoring values of supply current and supply voltage of said motor to produce a parameter variation signal which increases in level in response to a change in a degree of slip of said induction motor, said increase in level having a polarity determined by a direction of said change in degree of slip; and means for modifying said modulation signal by said parameter variation signal such as to increase said motor supply voltage in response to an increase in said degree of slip and to decrease said motor supply voltage in response to a decrease in said degree of slip.

As a result, such an induction motor control apparatus enables a high efficiency of operation of the motor to be achieved,, since the power factor of the motor can be held near a value which ensures high efficiency during a condition of gradually changing load torque on the motor, while in addition the control apparatus is configured such as to rapidly respond to any sudden changes in the load torque applied to the motor (thereby producing a corresponding change in the degree of slip of the motor), and in particular any sudden increase in the torque, such as to immediately adjust the motor supply voltage to a new value which is appropriate for the changed level of load torque. Thus for example there is no danger of stall occurring, in the event of a sudden-increase in load torque. Furthermore, such rapid response is achieved with complete stability of control.

BRIEF DESCRIPTION OF THE DRAWINGS

FIGS. 1A–1C together constitute FIG. 1 which is a system block diagram of a first embodiment of an induction motor control apparatus according to the present invention;

FIGS. 7(a)–7(c) show examples of operating waveforms in the apparatus of FIG. 1, responding to a sudden increase in applied motor load torque;

FIGS. 12A–112C together constitute FIG. 12 which shows a third embodiment of the present invention.

DESCRIPTION OF PREFERRED EMBODIMENTS

Figure 1B:
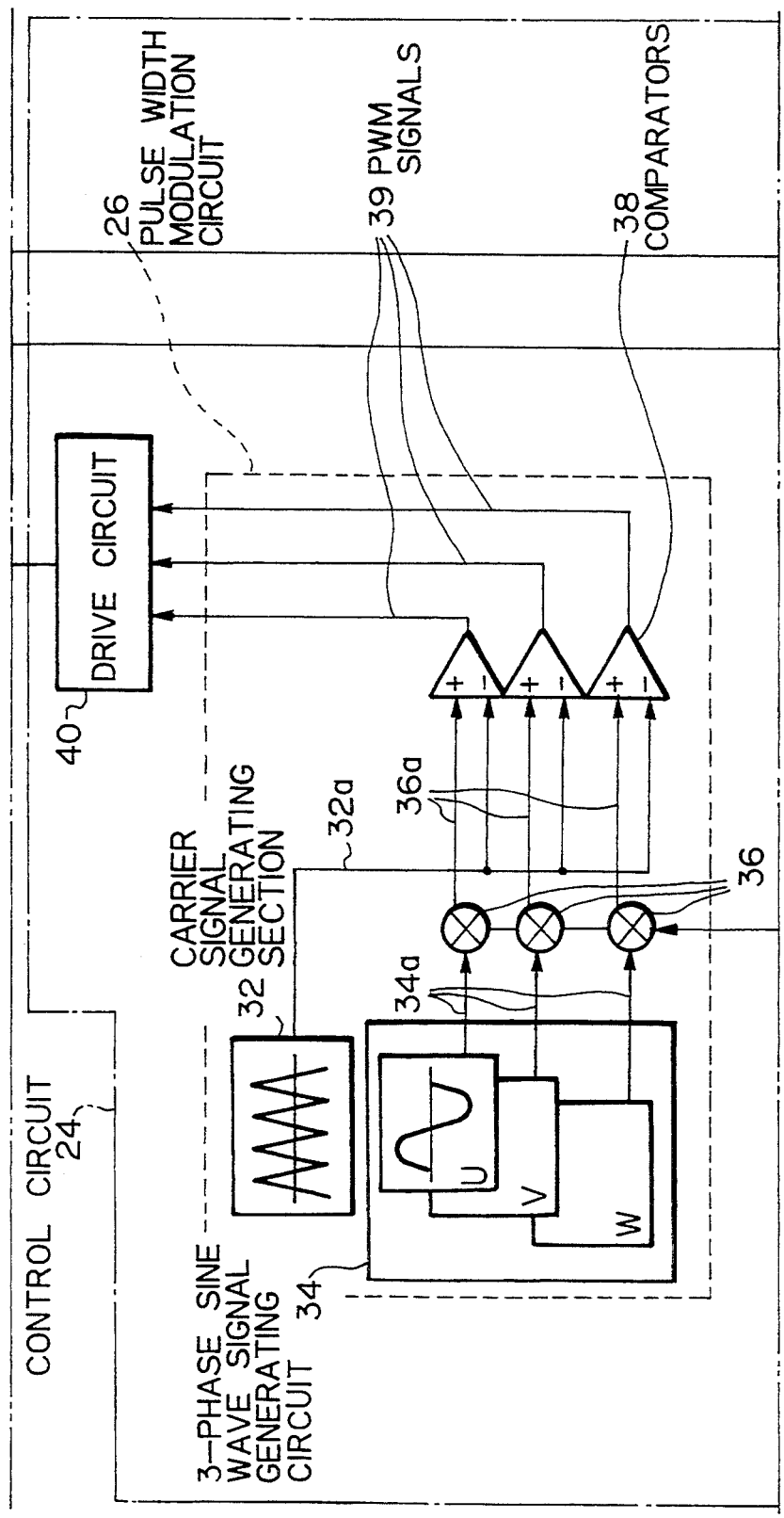
Figure 1C:
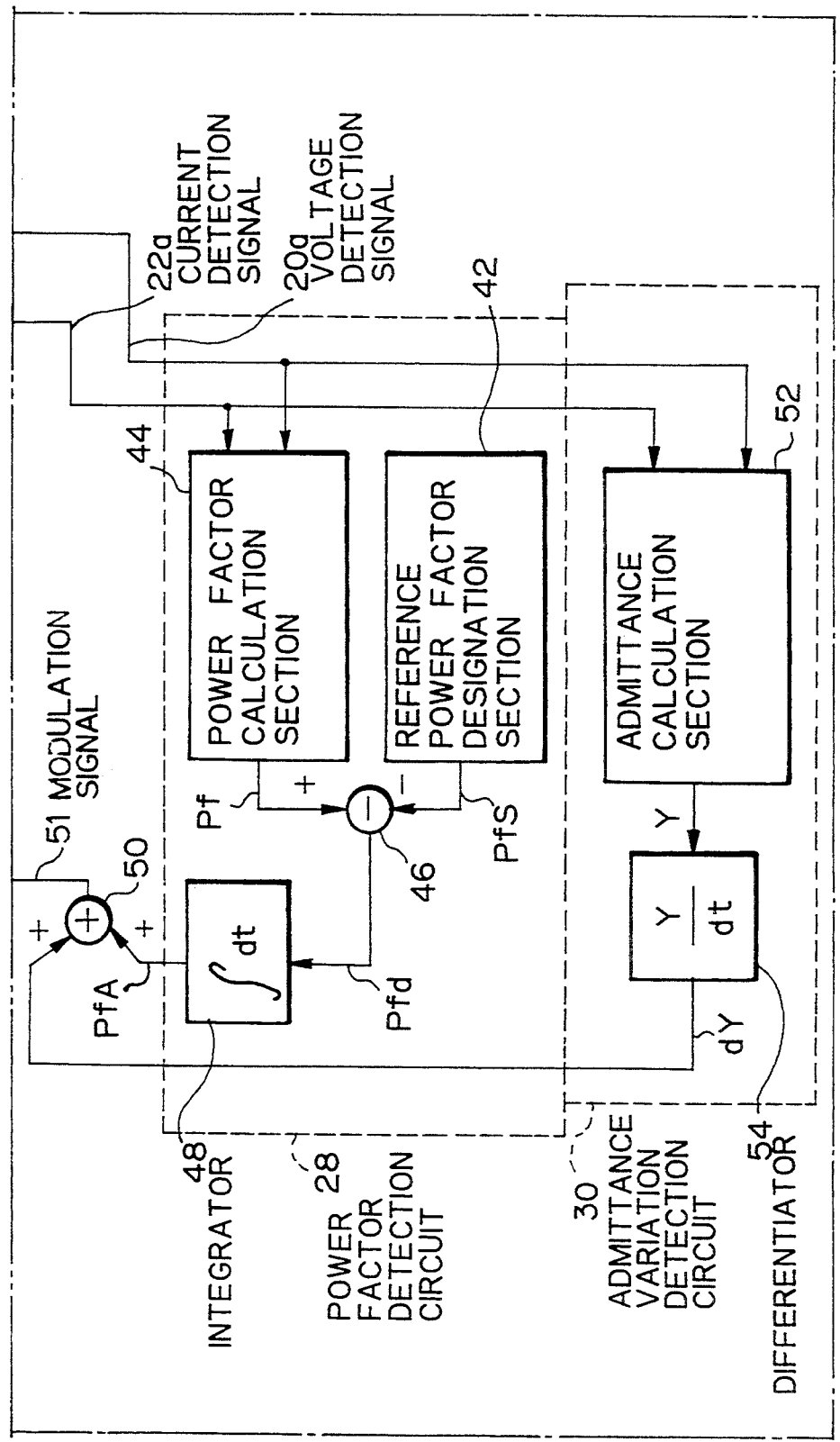

A first embodiment of the invention will be described referring to the system block diagram of FIG. 1. In FIG. 1, an induction motor control apparatus 14 according to the present invention is connected between an AC power source 10 and an induction motor 12. The control apparatus 14 consists of a rectifier circuit 16 for converting the voltage of the AC power source 10 to a DC voltage, an inverter 18 which converts that DC voltage to a 3-phase AC motor supply voltage (with the supply lead for only one phase being shown, for simplicity of description), and a control circuit 24 which supplies PWM (pulse width modulation) control signals to inverter section 18 for determining the amplitude of the motor supply voltage. The control apparatus 14 also includes a current transformer 22 and a voltage transformer 20, which supplies a current detection signal 22a and a voltage detection signal 20a respectively to the control circuit 24. These respectively express the values of motor current and motor supply voltage at which the induction motor 12 is operating. It will be assumed that with this embodiment the inverter section 18 produces a fixed frequency of motor supply voltage, however as described hereinafter the invention can be applied to an induction motor control apparatus which produces a variable-frequency motor supply voltage.

The control circuit 24 basically consists of a pulse width modulation (PWM) circuit 26, a power factor detection circuit 28 and an admittance variation detection circuit 30, together with a drive circuit 40 for driving the inverter section 18. The PWM circuit 26 consists of a carrier signal generating section 32 which generates a high-frequency triangular-waveform carrier signal, i.e. at a frequency which is higher than the frequency of the motor supply voltage, a sine wave signal generating section 34 which generates 3-phase AC voltage signals 34a which are of sine wave (or approximately sine wave) form, a set of three multipliers 36, and a corresponding set of three comparators 38 which produce 3-phase PWM signals 39 that are supplied to the drive circuit 40. In response to the PWM signals 39, the drive circuit 40 generates drive signals whereby the inverter section 18 produces the motor supply voltage at an amplitude determined by the duty ratio (i.e. modulation factor) of the PWM signals 39. A modulation signal 51 (described hereinafter) is supplied to each of the multipliers 36, for modulating the amplitudes of the sine wave signals 34a, with three-phase modulated sine wave signals 36a being thereby produced from the multipliers 36, and supplied to one input of each of the comparators 38. The carrier signal 32a is supplied to a second input of each of the comparators 38. The comparators serve to execute pulse width modulation of the modulated sine wave signals 36a by the carrier signal 32a, so that the multipliers 36 can be considered as a first modulator stage, and the comparators 38 as a second modulator stage, which produce the PWM signals 39.

The power factor detection circuit 28 consists of a power factor calculation section 44 which generates a detected power factor signal Pf expressing the power factor at which the induction motor 12 is operating, based on the voltage detection signal 20a and current detection signal 22a (indicating the levels of supply voltage and current at which the induction motor 12 is operating), a reference power factor designation section 42 which produces a reference power factor signal PfS expressing a reference value of power factor at which the motor is to operate (based on the voltage detection signal 20a and current detection signal 22a), a subtractor 46 which derives from the signals Pf and PfS a deviation signal Pfd expressing a degree of deviation between the actual power factor of the induction motor 12 and the designated reference power factor, and an integrator circuit 48 which integrates the deviation signal Pfd and produces a power factor adjustment signal PfA. The power factor adjustment signal PfA is supplied to one input of an adder 50.

The admittance variation detection circuit 30 is made up of an admittance calculation section 52 and a differentiator circuit 54. The admittance calculation section 52 serves to calculate the value of admittance at which the induction motor 12 is operating, based on the values of the voltage detection signal 20a and current detection signal 22a, and produces an output signal Y indicative of the admittance value. The differentiator circuit 54 operates on the admittance signal Y to detect changes in the admittance value, producing an output signal dY indicative of these changes. The admittance variation signal dY is supplied to the other input of the adder 50, which produces a modulation signal 51. The modulation signal 51 thereby varies in level in accordance with the combination of levels of the power factor adjustment signal PfA and the admittance variation signal dY. So long as the load torque applied to the induction motor 12 is constant, or is varying only gradually, the admittance variation signal dY will remain at a fixed (e.g. 0 V) level. However if an abrupt change in motor load occurs, so that there is a change in the degree of slip of the motor 12, then motor admittance will change in accordance with the change in the amount of slip. As a result, the admittance variation signal dY will temporarily change in level, by an amount which is basically determined by the rate of change and amount of change in motor load torque, and with a polarity determined by the direction of the change in load torque. The amplitudes of the modulated sine wave signals 36a are controlled, by the modulation signal 51, in accordance with the sum of the amplitudes of the input signals dY and PfA which are supplied to the adder 50. That is to say, control of the duty ratio of the PWM signals 39 is executed based on a modulation signal (51) whose level expresses an amount of deviation of the motor power factor from the reference power factor value, with that modulation signal level being modified in accordance with any rapid change in the motor load torque.

Figure 2:
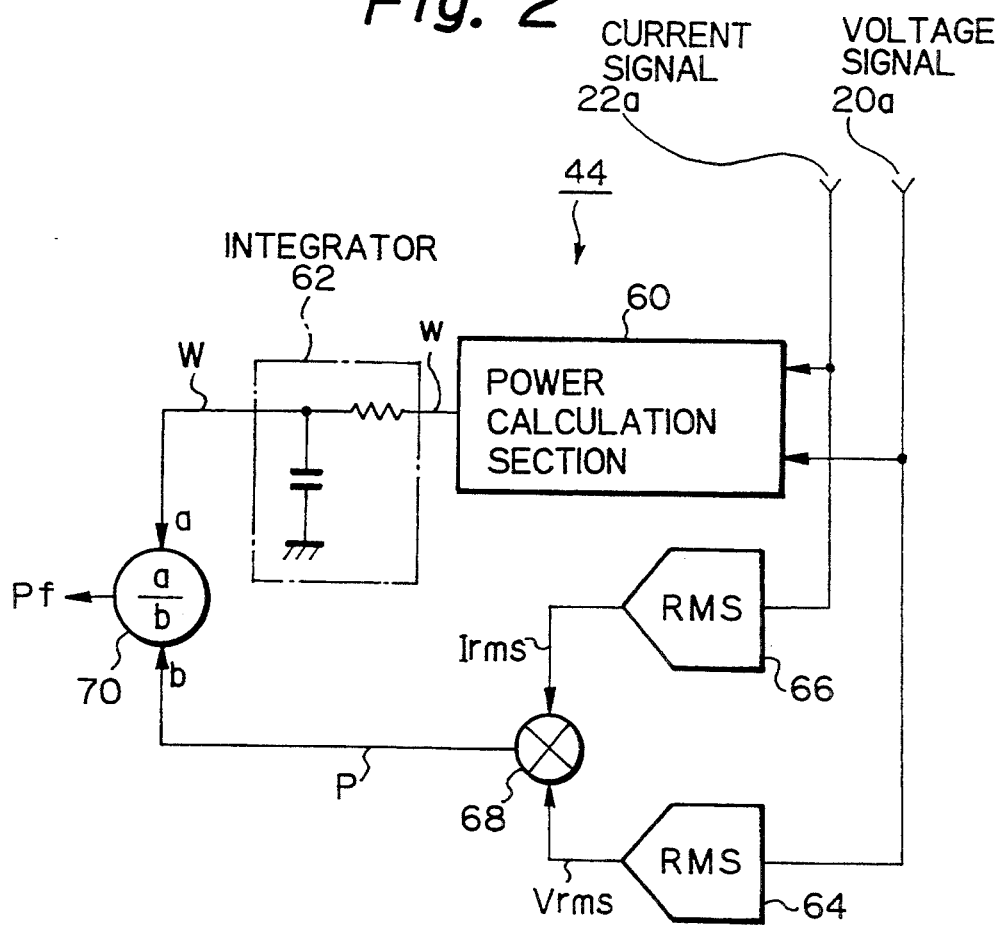
FIG. 2 shows an example of a configuration of a power factor calculation section in the embodiment of FIG. 1.

FIG. 2 shows an example of a specific configuration for the power factor calculation section 44 of FIG. 1. As shown, this consists of a power factor calculation circuit 60, for deriving a power signal W which varies in level in accordance with instantaneous values of power that are obtained from the current detection signal 22a and voltage detection signal 20a, an integrator circuit 62 which integrates the power signal W to obtain an integrated power signal (i.e. effective power value signal) W', an effective voltage value converter 64 for converting the voltage detection signal 20a to an effective voltage signal Vrms (expressing the RMS value of the motor supply voltage), an effective current value converter 66 for converting the current detection signal 22a to an effective current signal Irms (expressing the RMS value of the motor current), a multiplier 68 which obtains the product of the effective voltage and current signals Vrms, Irms to obtain an apparent power value signal P which expresses the level of apparent power at which the motor is operating, and a divider 70 which divides the effective power value signal W' by the apparent power value signal P, to obtain the power factor signal Pf. However it should be noted that it would be equally possible to use a conventional type of power factor derivation circuit, which detects the phase difference between motor supply voltage and current.

Figure 3:
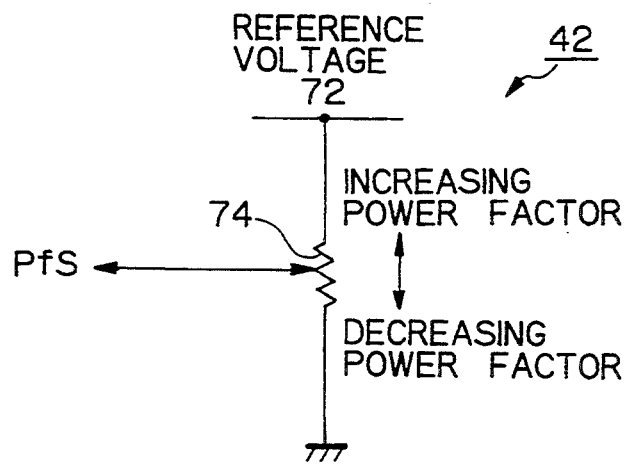
FIG. 3 shows an example of a configuration of a reference power factor designation section in FIG. 1.

FIG. 3 shows an example of a specific configuration for the reference power factor designation section 42 of FIG. 1. As shown, this consists of a potentiometer 74 having one end of the resistor thereof coupled to a reference voltage 72 and the other end coupled to ground (0 V) potential. An output voltage obtained from the slider of the potentiometer is utilized as the reference power factor signal PfS, i.e. designating an arbitrary desired value of reference power factor at which the induction motor 12 is to operate, which can be adjusted as required. The reference voltage 72 is a stabilized DC voltage, whose value preferably corresponds to a power factor of approximately 90%. That is to say, when the level of PfS is set at the reference voltage value, the designated reference power factor is 90%. In that case, the value of signal PfS can be varied between zero and the reference voltage value, so that the adjustment range for the reference power factor is from zero to 90%.

Figure 4:
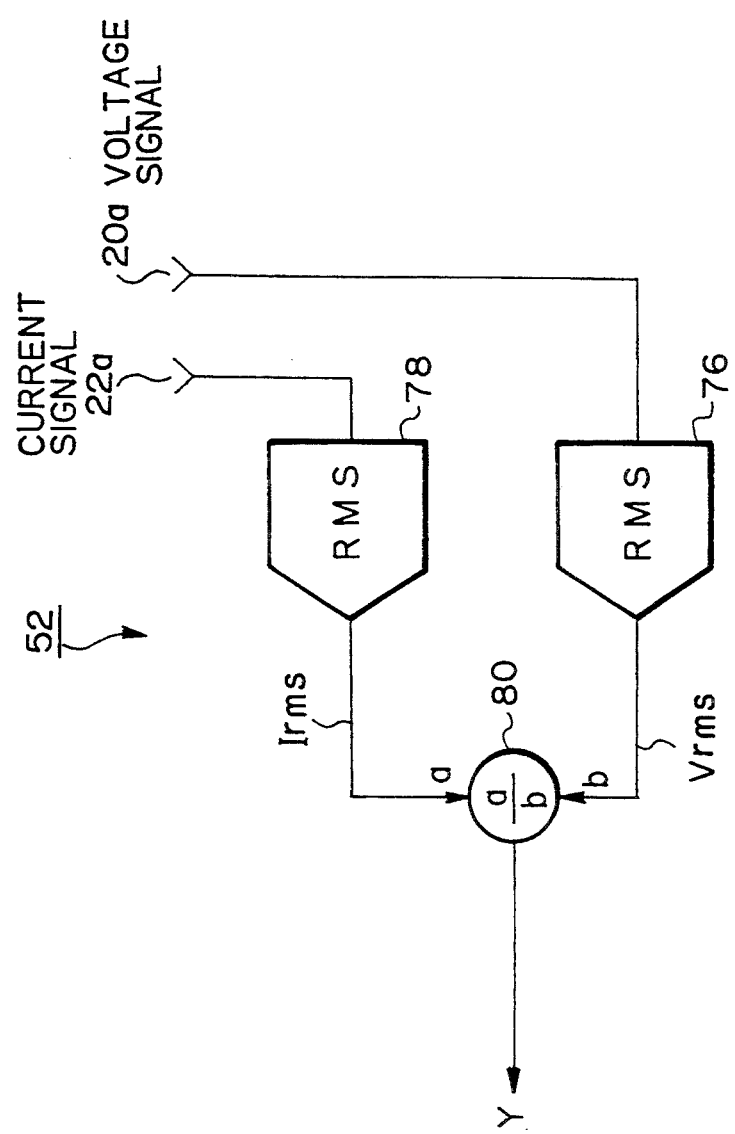
FIG. 4 shows an example of a configuration of an admittance calculation section in FIG. 1.

FIG. 4 shows a specific configuration for the admittance calculation section 52. As shown, this consists of an effective voltage value converter 76 for converting the voltage detection signal 20a to an effective voltage signal Vrms, an effective current value converter 78 for converting the current detection signal 22a to an effective current signal Irms, and a divider 80 for dividing the signal Irms by Vrms, to obtain the admittance signal Y as a signal which varies in level in accordance with the admittance at which the induction motor 12 is operating.

Figure 5:
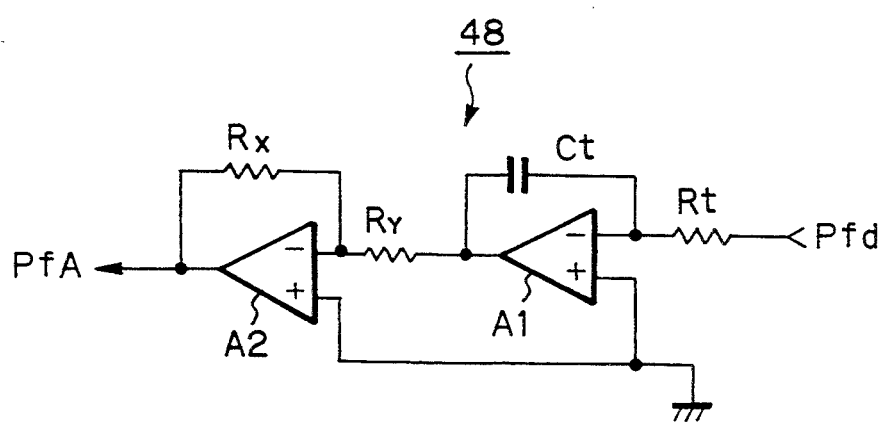
FIG. 5 shows an example of a configuration of an integrator circuit in FIG. 1.

FIG. 5 shows a specific configuration for the integrator circuit 48. As shown, this consists of resistors Rt, Rx, Ry, a capacitor Ct, and operational amplifiers A1 and A2. The circuit functions to integrate the deviation signal Pfd, which expresses the deviation of the actual power factor of the induction motor 12 from the reference power factor value, to thereby obtain the power factor adjustment signal PfA. The values of the capacitor Ct and resistor Rt will determine the time constant of integration, while the values of Rx and Ry can be selected to determine the overall gain of the circuit.

Figure 6:
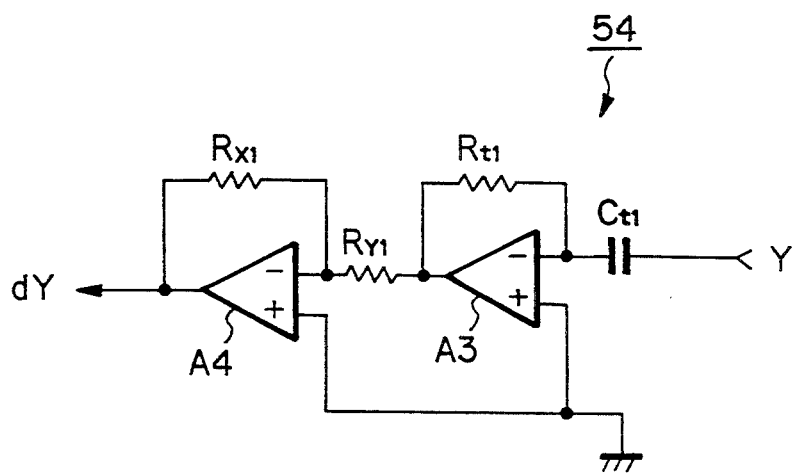
FIG. 6 shows an example of a configuration of a differentiator circuit in FIG. 1.

FIG. 6 shows a specific configuration for the differentiator circuit 54. As shown, this consists of a capacitor Ct1, resistors Rt1, Rx1 and Ry1, and operational amplifiers A3, A4. The circuit produces the admittance variation signal dY signal in accordance with an amount of change in level of the admittance signal Y, by integrating the signal Y. The values of Ct1, Rt1 determine the time constant of integration, while the circuit gain is determined by selecting the values of Rx1 and Ry1.

The operation of the embodiment of FIG. 1, at the time of occurrence of a sudden increase in the load torque on the induction motor 12, will be described referring to the timing diagrams (a) to (e) of FIG. 7. For ease of understanding, only the control operation based on detected power factor will be described at this stage, i.e. the effects of the admittance variation signal dY will be ignored. Diagram (a) illustrates the deviation signal Pfd, showing how that signal will change in response to a sudden increase in load torque which occurs at a time point T. It is assumed that prior to the point T, the modulation signal 51, illustrated in diagram (b), is at the zero level. It is also assumed that each of the sine wave signals 34a is actually of trapezoidal waveform, with one of these signals being illustrated in diagram (c). As can be understood from the modulated sine wave signals 36a and carrier signal generating section 32, illustrated in diagram (d) of FIG. 7, the modulation factor of the PWM signals 39 is determined by the amplitude of the modulated sine wave signals 36a. Following the time point T, when the motor load torque suddenly increases, the level the deviation signal Pfd increases as indicated by Pfd', and hence that of the modulation signal 51 also increases, as indicated by 51', so that the amplitude of the modulated sine wave signals 36a is increased, as indicated by 36a' in diagram (d). Hence the modulation factor of the PWM signals 39 is increased, as indicated by 39' in diagram (e), and hence the amplitude of the motor supply voltage produced from the inverter section 18 is accordingly increased. Thereafter (although not shown in FIG. 7) the amplitude of the motor supply voltage increases until the motor operating power factor (expressed by signal Pf) becomes identical to the designated reference power factor (expressed by signal PfS).

If on the other hand the load torque applied to the induction motor 12 were to be reduced, then the detected power factor would become lower than the reference power factor, so that the modulated sine wave signals 36a would be made smaller in amplitude, and hence the modulation factor of the PWM signals 39 would be decreased, thereby causing the motor supply voltage to be reduced until the detected power factor becomes identical to the reference power factor.

Hence, the PWM signals 39 which control the inverter section 18 are modulated by the modulation signal 51 such as to control the motor supply voltage at an appropriate level, in accordance with the designated reference power factor.

However in practice, if a sudden change in motor load torque occurs, such control which is based only upon power factor values will not provide satisfactory operation. That point will be described referring to the timing diagrams of FIG. 8. In FIG. 8 it is again assumed that the admittance variation signal dY is not applied, e.g. is held at the zero level as shown. It is further assumed that during an initial time interval designated as Ia, the motor load torque is constant at a level LT1. In that condition, the level of the deviation signal Pfd is zero, and the power factor adjustment signal PfA is constant at a certain value. At the start of a succeeding time interval Ib, the load torque suddenly increases from LT1 to a value LT2, so that the level of detected power factor signal Pf increases, and also the deviation signal Pfd increases, in the positive direction. That change in level of the deviation signal Pfd is integrated, to obtain the power factor adjustment signal PfA, which rises gradually in level during time interval Ib. In response to that change in the power factor adjustment signal PfA, the modulation signal 51 gradually increases, so that the motor supply voltage produced from the inverter section 18 begins to increase. As a result of that increase in the motor supply voltage, the level of the detected power factor signal Pf becomes identical to the reference power factor signal PfS, and hence the deviation signal Pfd reaches zero, at which point the increase in the motor supply voltage is halted. A time interval Ic then begins, in which the motor load torque remains constant at the value LT2.

However due to the sudden increase in the load torque from LT1 to LT2, the amplitude of the motor supply voltage has been insufficient during the time interval Ib, so that the motor current has increased substantially during that interval, as shown. If the rate of change of the power factor adjustment signal PfA were to be increased beyond that shown in FIG. 8, then it would become possible for the motor supply voltage to accurately follow the change in load torque, i.e. the duration of the time interval Ib could be made shorter. However such an increase in the speed of response of the closed loop which controls the motor supply voltage would result in instability of the loop, so that phenomena such as oscillation could occur, making it impossible to control the motor.

With the first embodiment of the present invention, that problem is overcome by making use of the increase in the motor admittance which occurs during the interval Ib, as indicated by the increase in level of the admittance signal Y. Specifically, during the intervals Ia, Ic and Ie in which the induction motor 12 operates at a constant load, the motor admittance is substantially constant. During the interval Ib which follows a sudden increase in the load torque so that there is an increase in the degree of slip, the admittance increases, as indicated by the change in level of admittance signal Y. Conversely the motor admittance is reduced during an interval such as Id, when a sudden reduction in the motor load occurs. The reason for these changes in admittance can be readily understood, since the motor admittance is simply the ratio of motor current to motor supply voltage.

In actual operation, these changes in admittance are detected by the differentiator circuit 54 of FIG. 1, as changes in level of the admittance variation signal dY which is applied to one input of the adder 50. The results of that are illustrated in the timing diagrams of FIG. 9, which shows the actual changes in signal levels occurring in the embodiment of FIG. 1 in response to sudden changes in motor load torque.

Figure 8:
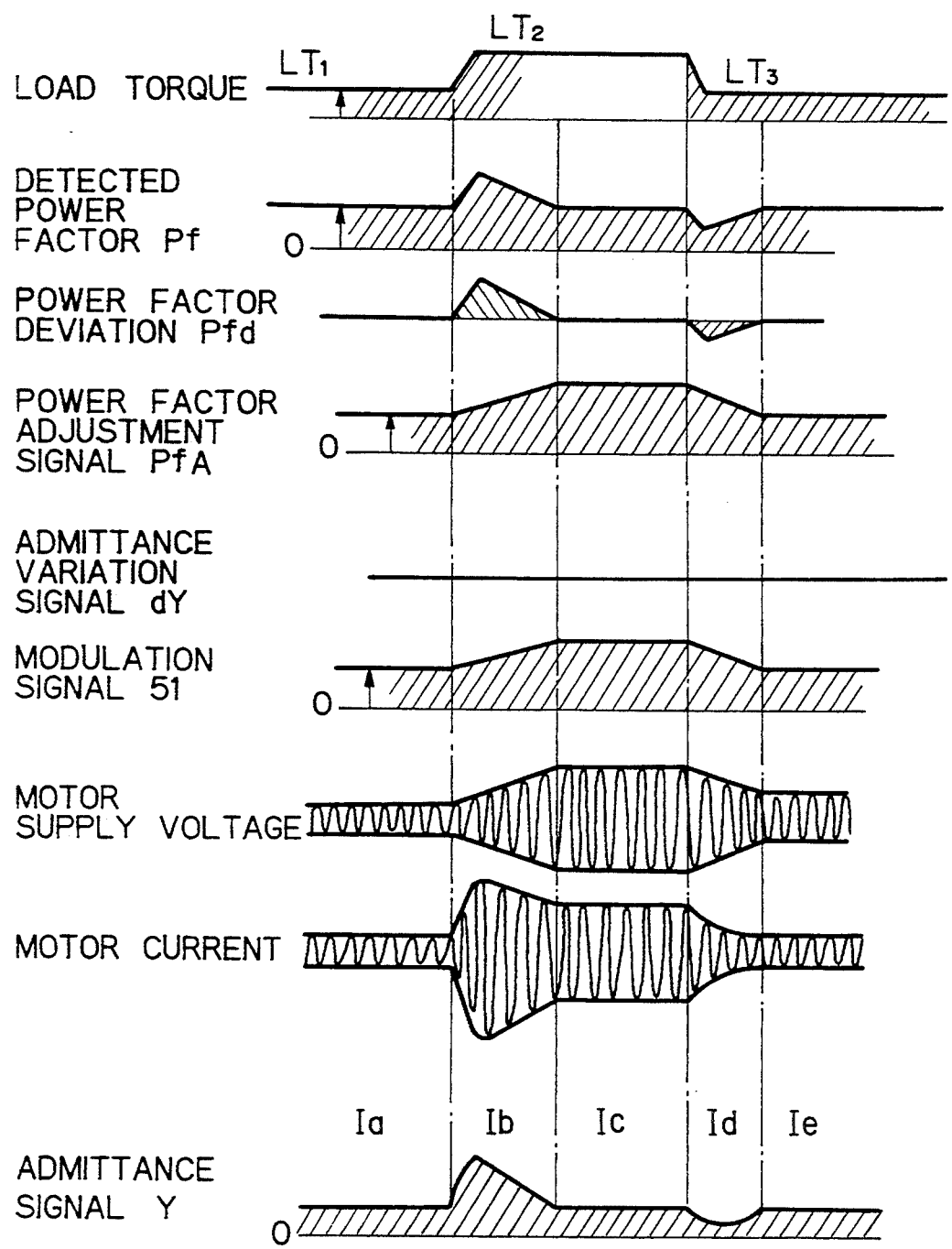
FIG. 8 shows timing diagrams illustrating the operation of the embodiment of FIG. 1, assuming for the purpose of description that an admittance variation signal is held at a fixed level.
Figure 9:
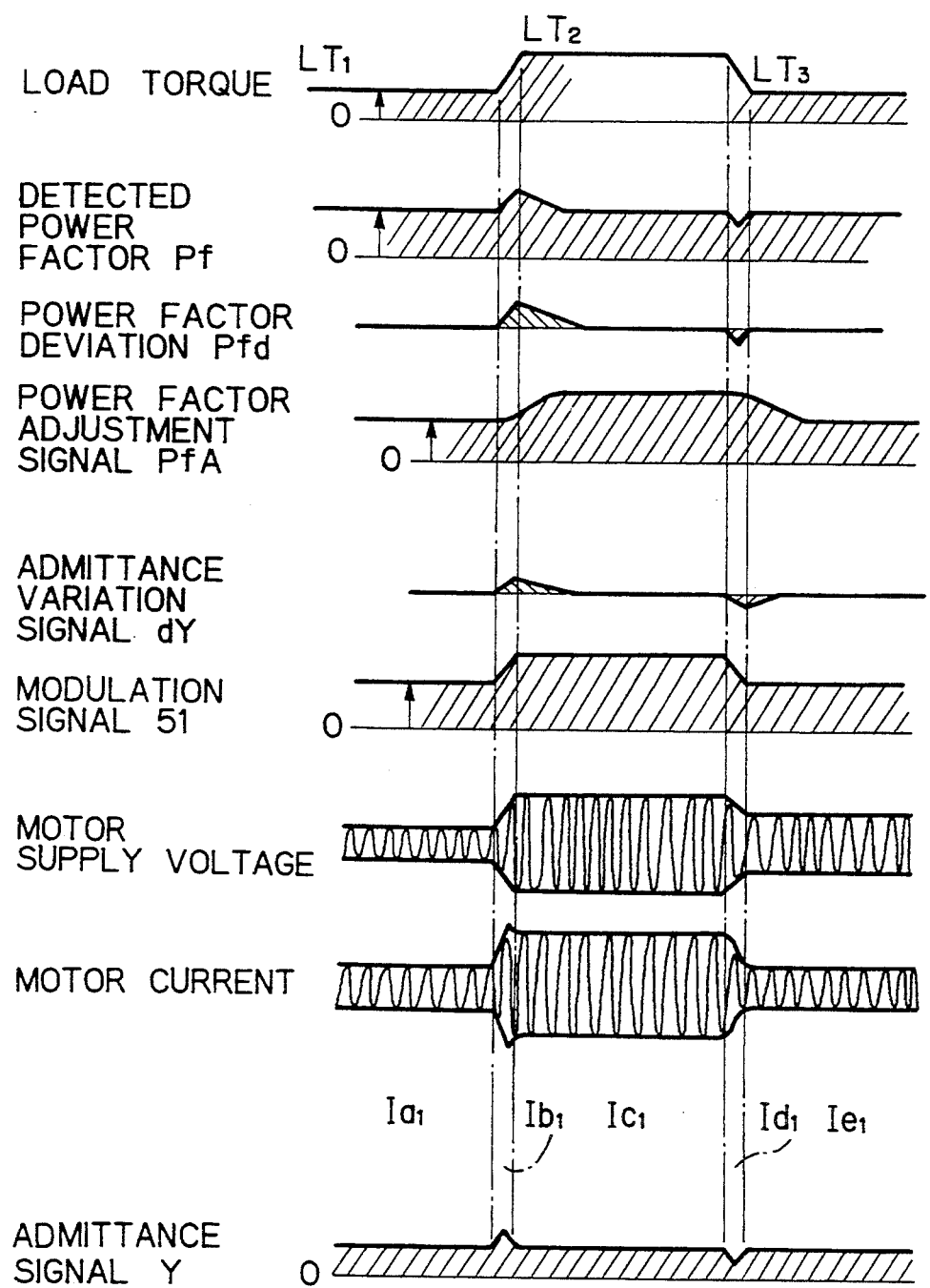
FIG. 9 shows timing diagrams corresponding to those of FIG. 8, but assuming normal operation of the admittance variation signal.

In FIG. 9, during the time interval Ib1 in which the load torque increases from LT1 to LT2, the motor supply voltage rapidly increases, and hence the motor current also increases rapidly during that interval. As a result, the duration of the interval Ib1 is substantially shorter than the corresponding interval Ib in the example of FIG. 8, showing that the response of the control apparatus to a sudden increase in load torque is much more rapid in the case of FIG. 8. However due to that fact that complete closed-loop control of the motor supply voltage by the admittance variation signal dY is not performed, there is no danger of occurrence of instability phenomena such as oscillation.

So long as there are no sudden changes in motor load, the admittance variation signal dY remains at the zero level, in which case only the power factor adjustment signal PfA is supplied to the adder 50, to obtain the modulation signal 51 which controls the value of motor supply voltage as described hereinabove. In that condition, the PWM circuit 26 generates the PWM signals 39 only in accordance with the level of the power factor adjustment signal PfA, i.e. closed loop control of the motor supply voltage based on the detected motor power factor is performed, with the operating power factor being held at the reference power factor value, and the induction motor 12 operating in a stable condition. During that condition, if there is a sudden change in the load torque, then there will be a corresponding change in the power factor adjustment signal PfA. However although the rate of change of that signal is only gradual, since a large-magnitude change rapidly occurs in the level of the admittance variation signal dY, a corresponding large-amplitude change (in a direction determined by the polarity of the change in the admittance variation signal dY) rapidly occurs in the modulation signal 51, resulting in a rapid change in the motor supply voltage in the appropriate direction to compensate for the change in load torque, i.e. increasing or decreasing the supply voltage value in accordance with whether the polarity of the admittance variation signal change is positive or negative.

It can be understood from the above description of the first embodiment that the essential features of the embodiment are as follows. A feedback control loop is established, in which a modulation signal (51) controls the motor supply voltage such as to maintain the power factor at which the induction motor operates at a value which is close to a reference power factor (expressed by the level of signal PfS in FIG. 1), during operation of the motor in condition in which only gradual changes in the load torque occur. However in addition, when a sudden change in load torque of the motor occurs, the resultant change in motor admittance is detected by taking the derivative with respect to time (dY/dt) of a signal expressing the value of motor admittance, to thereby obtain an admittance variation signal (dY) which attains a magnitude (during the sudden load torque transition) that is determined by the amount of change and rate of change of load, and whose polarity is determined by the direction of the change of load. That admittance variation signal, i.e. load change variation signal, is applied to the aforementioned control loop such as to increase or decrease the motor supply voltage, in accordance with whether there is an increase or a decrease in load torque.

Although in the above description it is assumed that the increase/decrease in motor admittance is detected, as an indication of a sudden increase/decrease in motor load torque, it would be equally possible to detect a corresponding decrease/increase in motor impedance, and to apply that to the supply voltage control loop such as to appropriately increase/decrease the motor supply voltage. In general, such a control apparatus derives a signal which indicates the value of an operating parameter (admittance or impedance) of the induction motor which varies when there is a sudden change in the load torque applied to the motor, i.e. which varies in response to a change in the amount of motor slip. That signal is then differentiated to obtain a parameter variation signal (dY), i.e. a signal which increases in amplitude only during a sudden change in load torque, increasing with one polarity when the torque is increased, and with the opposite polarity when the torque is decreased. The parameter variation detection signal is then combined with the aforementioned power factor adjustment signal (PfA) to obtain the modulation signal (51) such that when the parameter variation detection signal increases with the polarity corresponding to an increase in motor load, then the modulation signal (51) is changed in a direction tending to increase the motor supply voltage. Conversely, when the parameter variation detection signal increases with the opposite polarity, then the combining of that signal with the power factor adjustment signal is effected such that the modulation signal (51) is changed in a direction tending to reduce the motor supply voltage.

Figures 10, 10A:
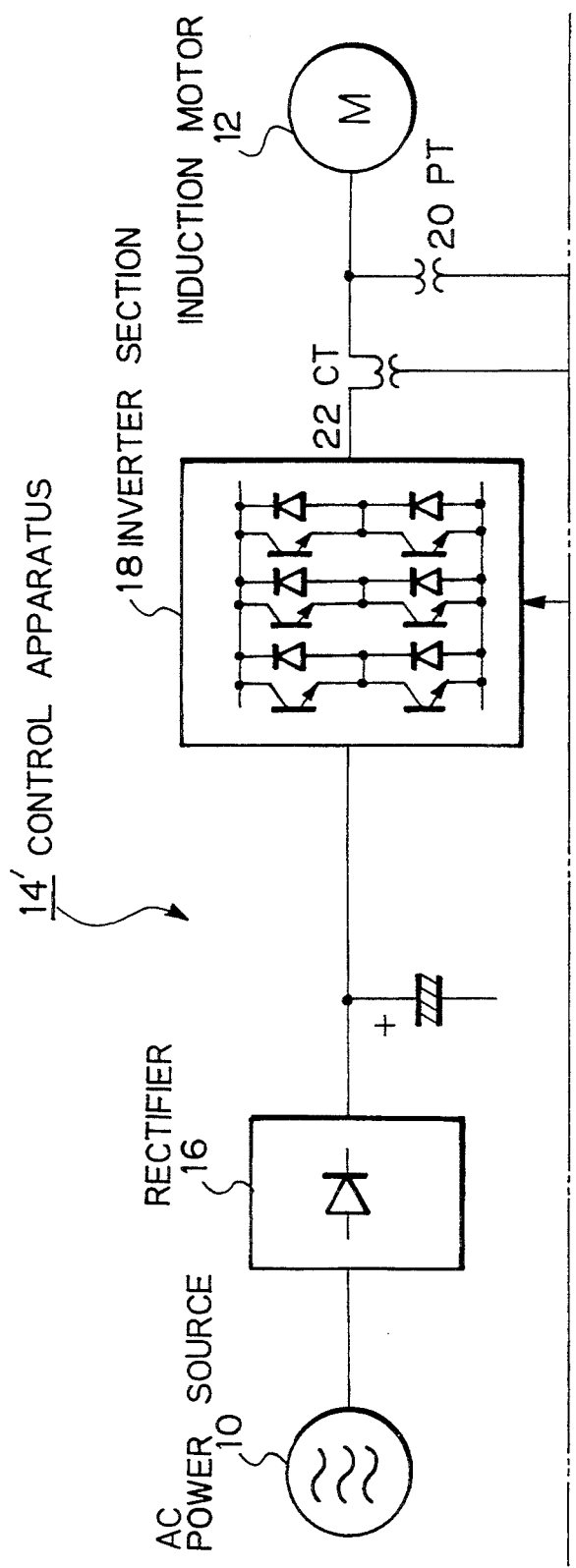
FIGS. 10–10C together constitute FIG. 10 which is a system block diagram of a second embodiment of the present invention.
Figure 10B:
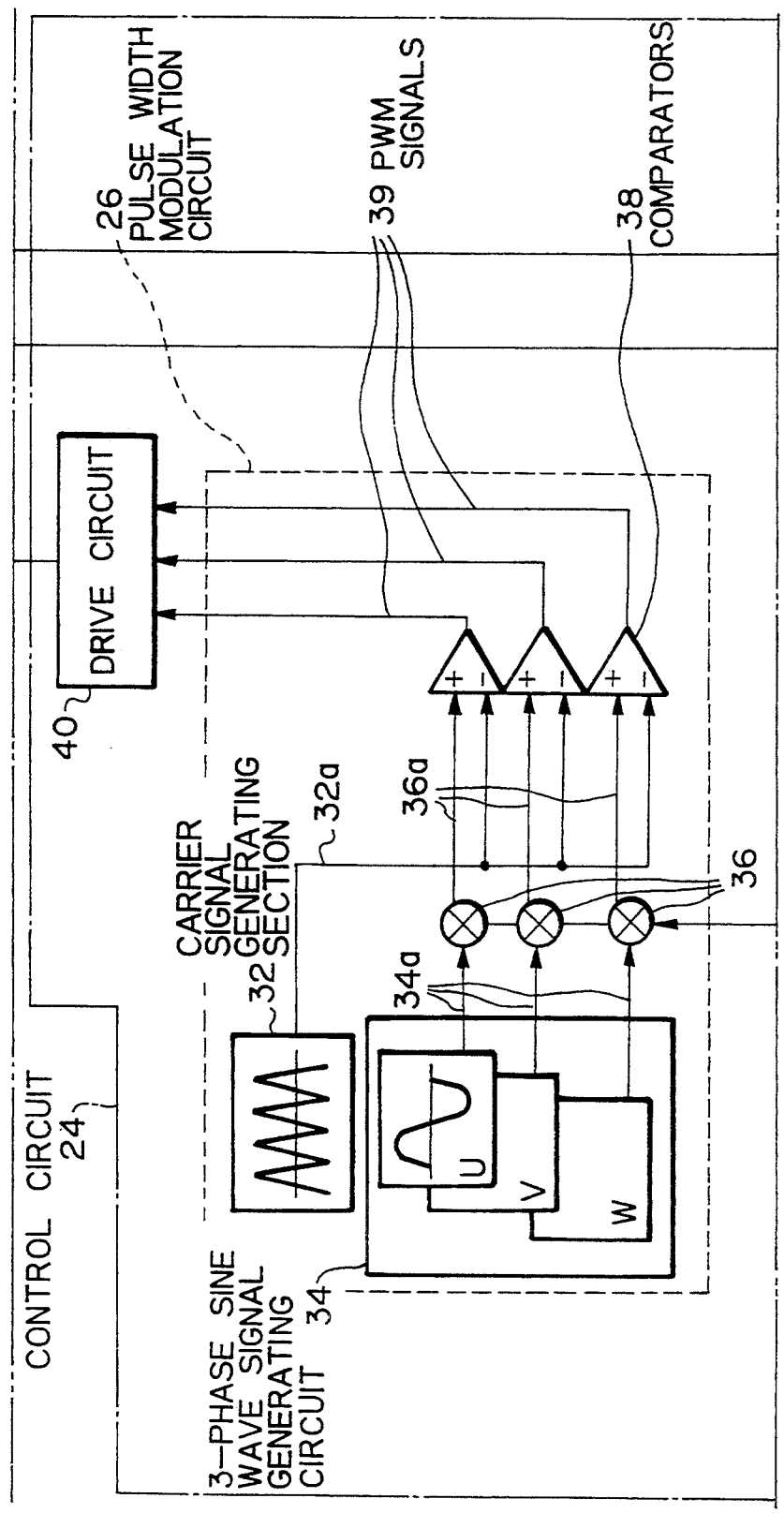
Figure 10C:
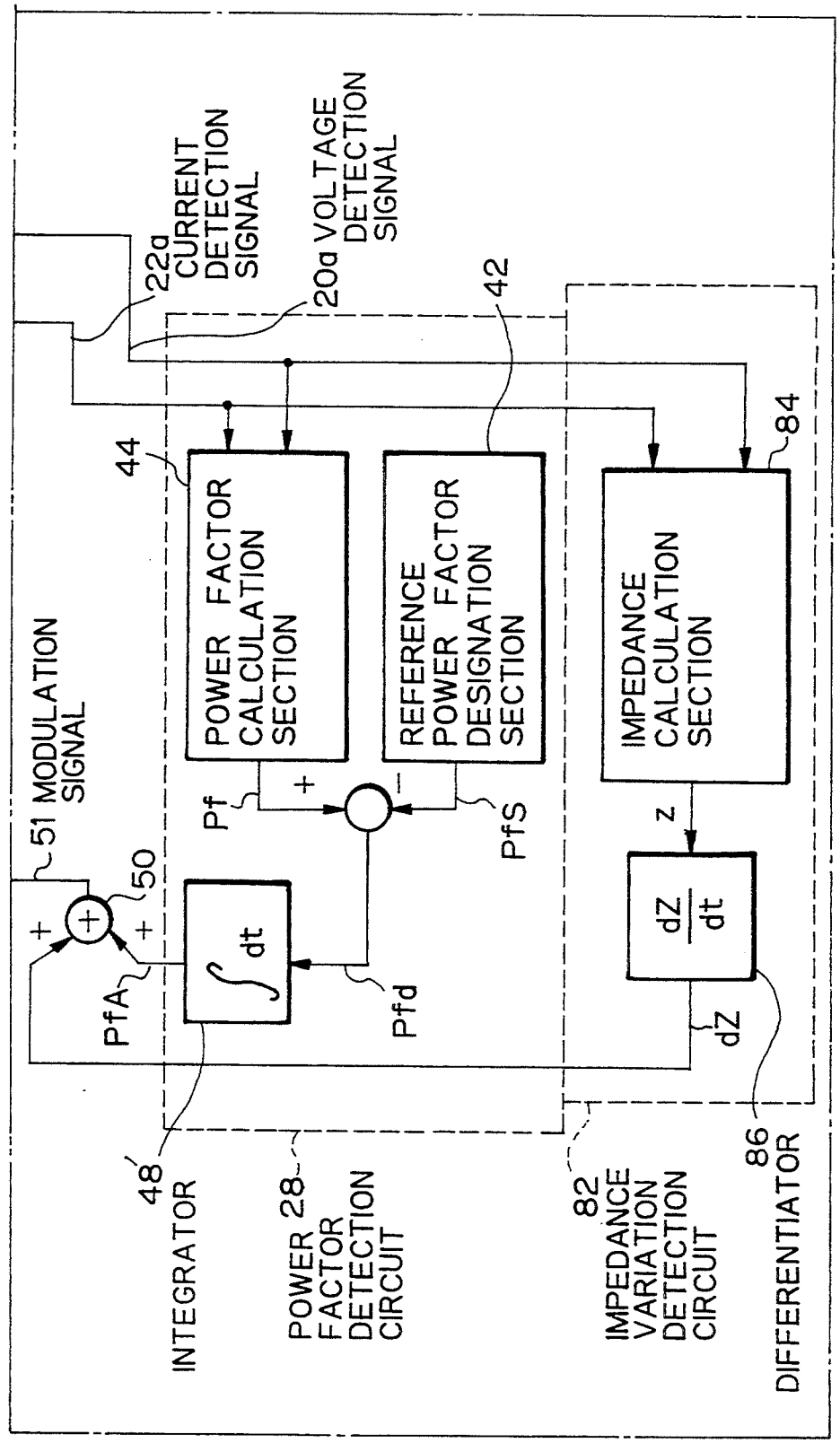

FIG. 10 is a system block diagram of a second embodiment of an induction motor control apparatus according to the present invention, in which changes in motor impedance are thus used. In FIG. 10, circuit elements corresponding to those of FIG. 1 are designated by corresponding reference numerals, and detailed description of these will be omitted. This embodiment differs from that of FIG. 1 only in that the control circuit 14' of this embodiment contains an impedance variation detection circuit 82, rather than the admittance variation detection circuit 30 of FIG. 1. The impedance variation detection circuit 82 contains an impedance calculation section 84, to obtain an impedance signal Z which varies in level in accordance with changes in the operating impedance of the induction motor 12. These changes in impedance are detected by a differentiator circuit 86, which produces an impedance variation detection signal dZ indicative of these changes. The detection signal dZ changes, in response to a change in motor impedance resulting from a sudden change in motor load torque, in the same way as the admittance variation signal dY of the first embodiment, i.e. increasing positively from zero when an increase in load torque occurs, and decreasing negatively from zero when a decrease in load torque occurs, as illustrated for the admittance variation-signal dY in FIG. 9.

Since the motor impedance is the inverse of the admittance, it can be understood that the differentiator circuit 86 can be configured in a similar manner to the differentiator circuit 54 as shown in FIG. 6, with the impedance signal Z applied to the capacitor Ct1, but with the input connections to one of the operational amplifiers A3, A4 reversed in polarity, or by adding an inverter stage at the output from operational amplifier A4, for example, and suitably selecting the resistor values to provide appropriate values of differentiation time constant and circuit gain. Alternatively, the circuit of FIG. 6 could be used directly, but with the adder 50 replaced by a subtractor, for subtracting the impedance variation signal from the signal PfA.

Figure 11:
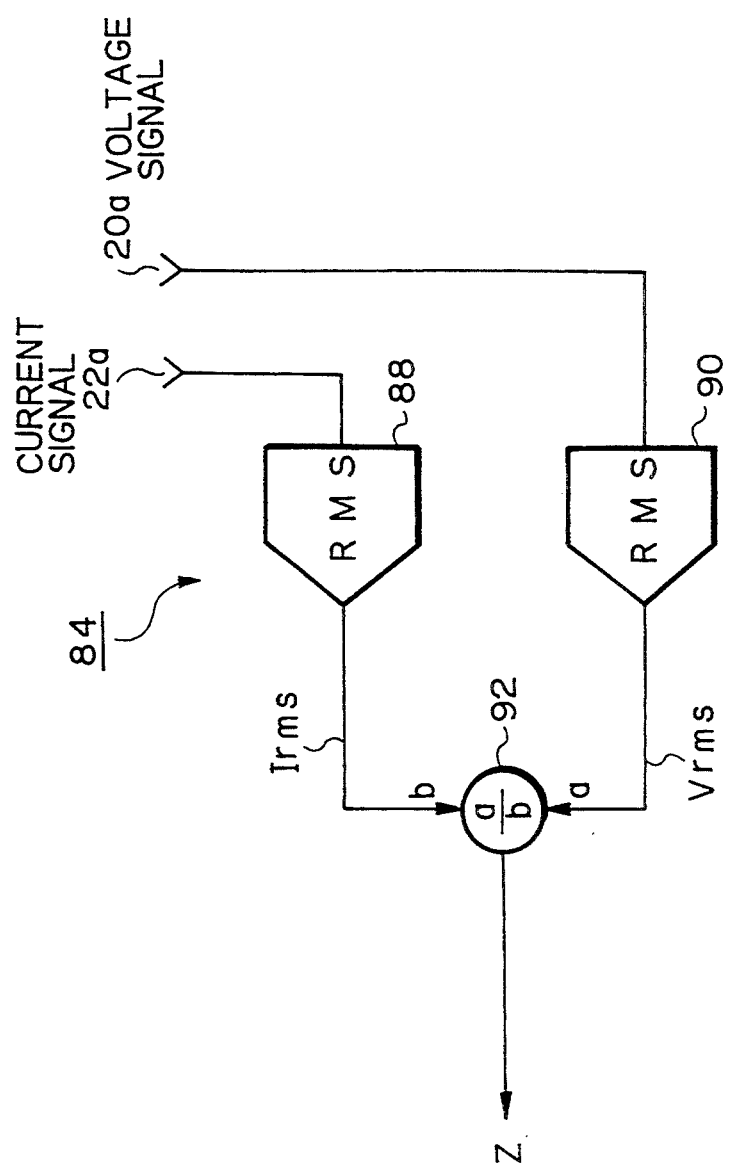
FIG. 11 shows an example of a configuration of an impedance calculation section in FIG. 10.

FIG. 11 shows an example of a specific configuration for the impedance calculation section 84. As shown, this consists of an effective current (i.e. rms current) value converter 88 which receives the current detection signal 22a, an effective voltage value converter 90 which receives the voltage detection signal 20a, and a divider 92 for dividing the effective voltage signal Vrms thus obtained by the effective current signal Irms, to obtain the impedance signal Z, which varies in level in accordance with the impedance of the induction motor 12.

In the same way as for the first embodiment, the impedance variation signal dZ is supplied to one input of the adder 50, to be added to the power factor adjustment signal PfA from the power factor detection circuit 28, to obtain the modulation signal 51. It will be understood that the operation of this embodiment is substantially similar to that of the first embodiment, and that similar advantages can be obtained to those described for the first embodiment.

Figure 12A:
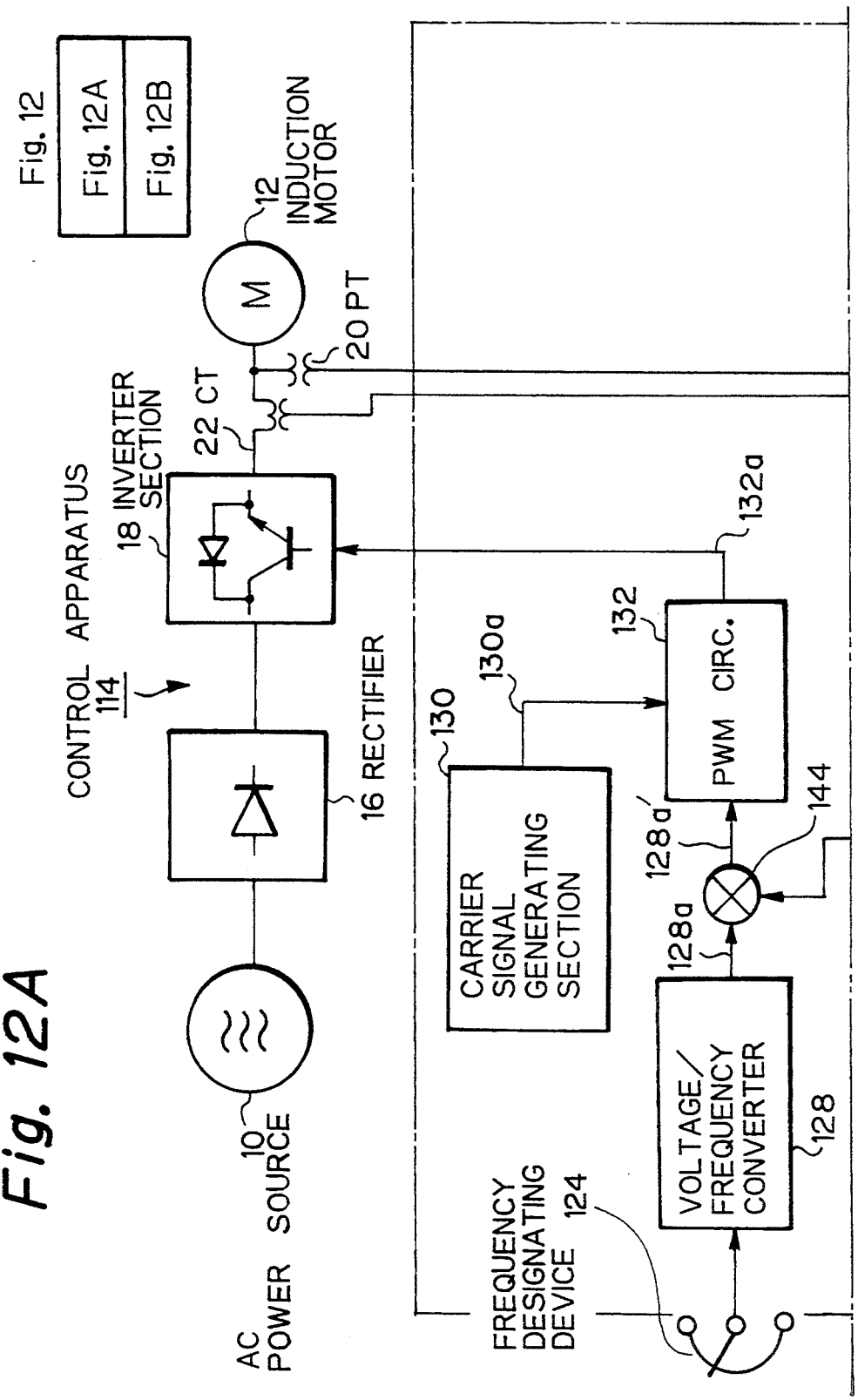
Figure 12B:
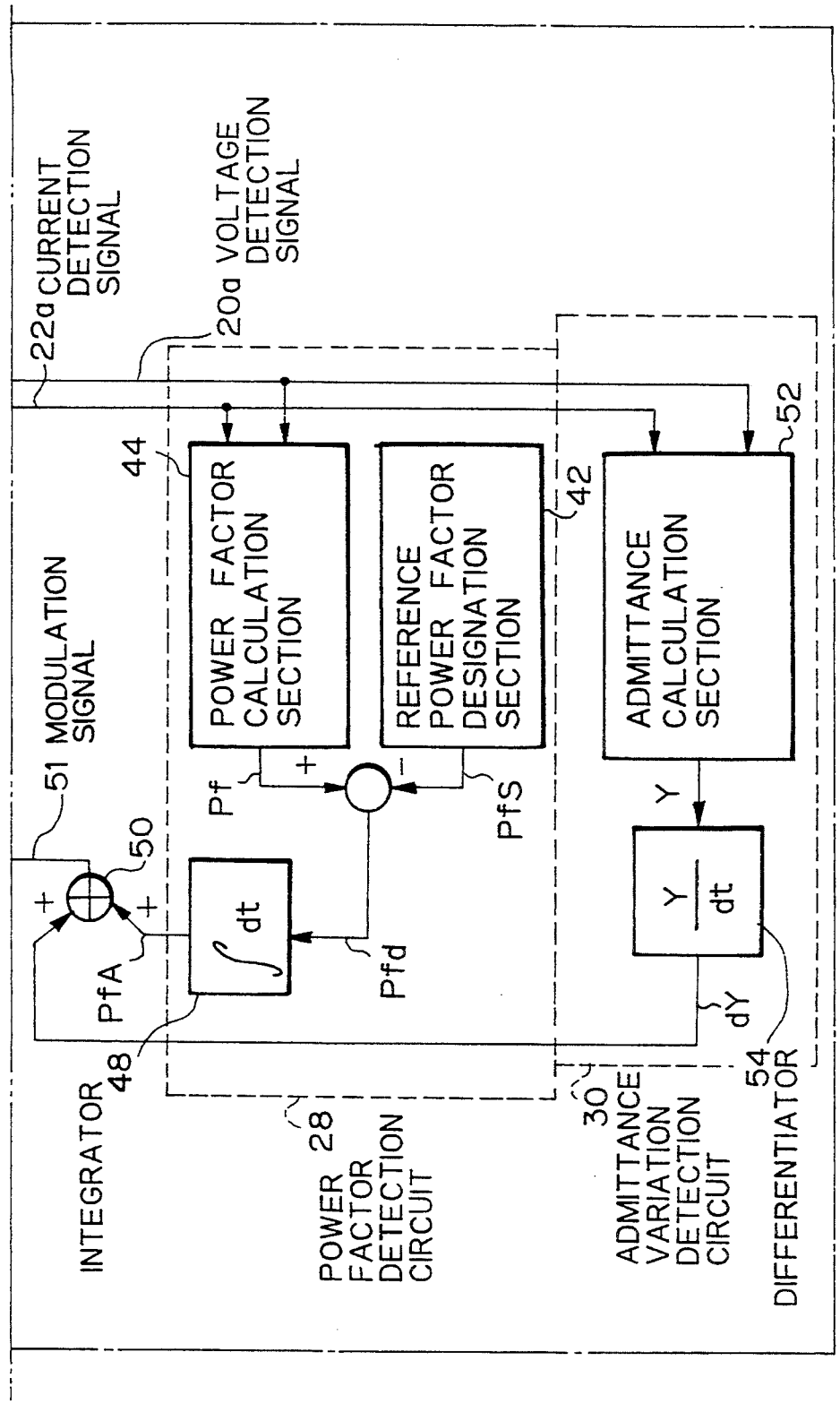

A third embodiment of an induction motor control apparatus according to the present invention will be described referring to the system block diagram of FIG. 12. The control apparatus 114 of this embodiment differs from that of the embodiment of FIG. 1 in that the frequency of the motor supply voltage can be adjusted as required, by means of an externally operable frequency designating device 124, which can be adjusted to produce a frequency designating signal, i.e. an adjustable voltage, which is supplied to a voltage/frequency converter 128. The voltage/frequency converter 128 generates a sine wave (or approximately sine wave) AC signal 128a at a designated frequency which is determined by the level of the frequency designation signal. More specifically, assuming that a 3-phase motor supply voltage is generated by the inverter section 18, as in the first embodiment, the voltage/frequency converter 128 actually generates a set of 3-phase sine wave signals at the designated frequency, however for simplicity of description only the circuit connections for one phase are shown in FIG. 12.

In the same way as for the first embodiment, the sine wave signal 128a is modulated in a multiplier 144 by the modulation signal 51, to obtain a modulated signal 128a' which is supplied to a PWM circuit 132. The PWM circuit 132 receives a triangular-waveform carrier signal 130a from a carrier signal generating section 130, to produce drive signals 132a for driving the inverter section 18, i.e. performs the functions of the comparators 38 and drive circuit 40 of the first embodiment. It can be understood from the description of FIG. 7 hereinabove that the frequency of the motor supply voltage produced from the inverter section 18 is determined by the modulation frequency of the PWM drive signals supplied to the inverter section 18, i.e. the frequency of the sine wave signal 128a produced from the voltage/frequency converter 128, so that the motor supply voltage frequency can be adjusted as required, by means of the frequency designating device 124.

In other respects, the operation of this embodiment is similar to that of the first embodiment, so that further description will be omitted.

From the above description of preferred embodiments, it can be understood that the present invention enables an induction motor to be operated at a desired value of power factor, e.g. a value which will ensure high efficiency, while at the same time enabling the induction motor to be controlled such as to very rapidly follow any sudden changes in the load torque imposed on the motor. In particular, an induction motor control apparatus according to the present invention can ensure that there is no danger of stalling of the motor in the event of a sudden increase in load torque, while in addition the possibility of control loop instability phenomena, such as oscillation, is eliminated.

Although the invention has been described in the above referring to specific embodiments, it should be understood that various modifications to these embodiments could be envisaged, which would fall within the scope claimed for the invention.

What is claimed is:

1. An induction motor control apparatus for controlling the value of an AC voltage which is derived from an AC power source voltage and is supplied to an induction motor as a motor supply voltage, the apparatus comprising:

conversion means for converting said AC power source voltage to said motor supply voltage;

means for deriving a voltage detection signal indicative of said value of the motor supply voltage and a current detection signal indicative of a value of supply current of said induction motor;

reference power factor designation means for producing a reference power factor designation signal indicative of a target value of operating power factor of said induction motor;

power factor calculation means responsive to said voltage detection signal and current detection signal for deriving a power factor signal indicative of an actual operating value of power factor of said induction motor;

means for operating on said power factor signal and reference power factor designation signal to obtain a deviation signal indicative of an amount of deviation of said actual operating value of power factor from said target value of power factor;

integrator means for integrating said deviation signal to obtain a power factor adjustment signal;

parameter calculation means for operating on said voltage detection signal and current detection signal to derive an operating parameter signal, said operating parameter signal varying in level in accordance with a degree of slip of said motor;

differentiator means for differentiating said operating parameter signal to obtain an operating parameter variation signal, said operating parameter variation signal increasing in level with a first polarity in response to an increase in a load torque applied to said induction motor and increasing in level with a second polarity in response to a decrease in said load torque; and combining means for combining said operating parameter variation signal with said power factor adjustment signal to obtain a modulation signal, and for supplying said modulation signal to said conversion means;

said conversion means being controlled by said modulation signal to vary said motor supply voltage such as to reduce said amount of deviation, and said combining means being configured such as to change said modulation signal in a direction tending to increase said motor supply voltage when said operating parameter variation signal increases with said first polarity and in a direction tending to decrease said motor supply voltage when said operating parameter variation signal increases with said second polarity.

2. An induction motor control apparatus according to claim 1, wherein said operating parameter is a value of admittance at which said induction motor is operating.

3. An induction motor control apparatus according to claim 1, wherein said operating parameter is a value of impedance at which said induction motor is operating.

4. An induction motor control apparatus according to claim 1, wherein said combining means comprises adder means.

5. An induction motor control apparatus according to claim 1, wherein said conversion means comprises:

rectifier circuit means for converting said AC power source voltage to a DC voltage;

DC-to-AC converter means for converting said DC voltage to said motor supply voltage; and pulse width modulation control means coupled to receive said modulation signal, for generating a pulse width modulation signal having a predetermined modulation frequency and having a modulation factor controlled in accordance with said modulation signal;

said pulse width modulation signal being supplied to said DC-to-AC converter means, for controlling said motor supply voltage to have a frequency determined by said modulation frequency and an amplitude determined by said modulation factor.

6. An induction motor control apparatus according to claim 5, wherein said pulse width modulation control means comprises:

means for generating a high-frequency carrier signal at a fixed frequency;

means for generating an alternating voltage signal at a frequency which is lower than said frequency of the carrier signal;

first modulation means for executing amplitude modulation of said alternating voltage signal by said modulation signal, to obtain a modulated alternating voltage signal;

second modulation means for executing pulse width modulation of said modulated alternating voltage signal by said carrier signal, to obtain a pulse width modulation signal; and drive circuit means for supplying said pulse width modulation signal to said DC-to-AC voltage converter means.

7. An induction motor control apparatus according to claim 6, wherein said means for generating said alternating voltage signal is responsive to a frequency control signal for varying said frequency of the alternating voltage signal, and further comprising externally operable means for generating said frequency control signal, said externally operable means being adjustable for varying said frequency control signal to set said frequency of the alternating voltage signal at an arbitrary value.

* * * * *